(12) United States Patent
Duan et al.

(10) Patent No.: US 11,015,158 B2
(45) Date of Patent: May 25, 2021

(54) METHODS AND COMPOSITIONS FOR FINING FERMENTABLE BEVERAGES

(71) Applicant: DANSTAR FERMENT AG, Zug (CH)

(72) Inventors: David W. Duan, Abbotsford (AU); Peter J. Rogers, Abbotsford (AU); Eric Wilkes, Abbotsford (AU)

(73) Assignee: DANSTAR FERMENT AG, Zug (CH)

( * ) Notice: Subject to any disclaimer, the term of this patent is extended or adjusted under 35 U.S.C. 154(b) by 0 days.

(21) Appl. No.: 14/683,696

(22) Filed: Apr. 10, 2015

(65) Prior Publication Data

US 2015/0353878 A1 Dec. 10, 2015

Related U.S. Application Data

(63) Continuation of application No. 12/602,520, filed as application No. PCT/AU2008/000802 on Jun. 4, 2008, now abandoned.

(30) Foreign Application Priority Data

Jun. 4, 2007 (AU) .............................. 2007903002

(51) Int. Cl.
| | |
|---|---|
| C12H 1/10 | (2006.01) |
| A23L 2/70 | (2006.01) |
| A23L 2/80 | (2006.01) |
| C12C 5/00 | (2006.01) |
| C12G 1/02 | (2006.01) |
| C12H 1/056 | (2006.01) |

(52) U.S. Cl.
CPC ................. *C12H 1/10* (2013.01); *A23L 2/70* (2013.01); *A23L 2/80* (2013.01); *C12C 5/00* (2013.01); *C12G 1/02* (2013.01); *C12H 1/0424* (2013.01); *A23V 2002/00* (2013.01)

(58) Field of Classification Search
CPC ..... A23L 2/80; A23L 2/52; A23L 2/02; A23L 2/38; A23L 2/70; A23L 1/0524; A23L 1/0532; C12H 1/0416; C12H 1/063; C12H 1/10; C12C 7/24; C12C 5/00; C12G 1/02; C12G 3/02; A23V 2250/5072; A23V 2250/5036; A23V 2250/50362; A23V 2250/50364; A23V 2250/50724
USPC ...... 426/590, 599, 51, 592, 495, 330.5, 489, 426/11, 15, 330.3, 330.4
See application file for complete search history.

(56) References Cited

U.S. PATENT DOCUMENTS

| | | | |
|---|---|---|---|
| 1,631,384 A | 6/1927 | Richmond | |
| 2,419,930 A | 4/1947 | Wilson | |
| 3,052,548 A | 9/1962 | Nugey | |
| 3,293,040 A | 12/1966 | Shaler, Jr. et al. | |
| 3,770,454 A | 11/1973 | Stone | |
| 5,059,431 A | 10/1991 | Daeschel et al. | |
| 5,567,451 A | 10/1996 | Rinn et al. | |
| 6,045,852 A | 4/2000 | Talley | |
| 6,699,977 B1 | 3/2004 | Gerrish et al. | |
| 7,160,563 B1 | 1/2007 | Malcorps et al. | |
| 2003/0064143 A1 | 4/2003 | Gerrish et al. | |
| 2003/0157218 A1 | 8/2003 | Donhowe | |
| 2004/0096565 A1 | 5/2004 | Evans et al. | |
| 2005/0220935 A1 | 10/2005 | Oono | |

FOREIGN PATENT DOCUMENTS

| | | |
|---|---|---|
| AU | 772 345 | 11/2001 |
| EP | 111420 A2 | 6/1984 |
| EP | 0 377 301 | 7/1990 |
| GB | 555089 | 8/1943 |
| GB | 571368 | 8/1945 |
| GB | 2 342 921 | 4/2000 |
| GB | 2 395 413 | 5/2004 |
| JP | 61-132140 | 6/1986 |
| JP | 02006408 | 1/1990 |
| WO | WO 1998/00519 | 1/1998 |
| WO | WO 9818902 A1 | 5/1998 |
| WO | WO 2006/032088 A2 | 3/2006 |

OTHER PUBLICATIONS

Anonymous "Pectin", Wikipedia, the free encyclopedia: XP002567848; retrieved from the Internetx URL.htti//en.wikipedia.org/wiki/Pectin. retrieved on Feb. 10, 2010.
Supplementary European Search Report, dated Feb. 10, 2010.
Office Action dated May 7, 2012 in U.S. Appl. No. 12/524,942.
Office Action dated Jun. 8, 2011 in U.S. Appl. No. 12/524,942.
Manay, Shakuntala N., and Shadaksharaswany, M., "Foods: Facts and Principles" (2001), New Age International (P) Limited Publishers, pp. 30-31.
International Search Report dated Oct. 27, 2005, for Australian Application No. PCT/AU2005/001439.
Pisamitski, A., et al., "Stimulation of the Clarification of Apple Juices and Wines", *Vinodelie I Vinogradarstvo SSSR* (1972), (4), 27-29.
Office Action dated Dec. 20, 2012 in U.S. Appl. No. 11/663,274.
Office Action dated Jun. 6, 2020 in U.S. Appl. No. 11/663,274.
Office Action dated Sep. 23, 2011 in U.S. Appl. No. 11/663,274.
Nozaki, Adachi H., and Sakaguchi T., Derwent Abstract, English translation of JP 02006408, pp. 1-4.
Castellari, M. et al., "Removal of Ochratoxin A in Red Wines by Adsorption Treatments with Commercial Fining Agents", *J. Agric. Food Chem.*, vol. 49, pp. 3917-3921 (2001).
International Search Report issued in International Application No. PCT/AU2008/000802, dated Jul. 11, 2008.

(Continued)

*Primary Examiner* — Vera Stulii
(74) *Attorney, Agent, or Firm* — Finnegan, Henderson, Farabow, Garrett & Dunner LLP

(57) ABSTRACT

The present disclosure relates to methods and compositions for fining fermentable beverages, such as alcoholic fermentable beverages, for example, wine, beer, lager, ale, cider, perry, spirit and liqueur. The compositions herein comprise a pectin and carrageenan which are used to treat the beverage prior to fermentation.

13 Claims, 4 Drawing Sheets

(56) References Cited

OTHER PUBLICATIONS

Patent Abstract of Japan for JP 61-132140, dated Jun. 19, 1986.
New Zealand Examination Report in Application No. 578877, dated Aug. 13, 2010.
Supplementary European Search Report in EP 08 75 6890, dated Oct. 20, 2010.
Supplementary European Search Report in EP 05 78 4633 dated Jan. 30, 2013.
Notice of Allowance dated Nov. 6, 2013, in U.S. Appl. No. 11/663,274.
Office Action dated Aug. 13, 2013, in U.S. Appl. No. 12/521,942.
Bemiller, James N., *"An Introduction to Pectins: Structure and Properties, in Chemistry and Function of Pectins"*, pp. 1-12 (1985).
Baker R.A, "Clarification With Low Methoxyl Pectins," Proc. Fla. State Hort. Soc., 1976, vol. 89, pp. 163-165.

METHODS AND COMPOSITIONS FOR FINING FERMENTABLE BEVERAGES

This application is a continuation of application Ser. No. 12/602,520, filed Mar. 4, 2010, which is a National Stage filing under 35 U.S.C. § 371 of International Application No. PCT/AU2008/000802 filed on Jun. 4, 2008, which claims priority of Australian Patent Application No. 2007903002, filed on Jun. 4, 2007.

FIELD

The present invention relates to methods and compositions for fining fermentable beverages, in particular alcoholic fermentable beverages such as wine, beer, lager, ale, cider, perry, spirit and liqueur.

BACKGROUND

In general wine making practice, the wine after fermentation has to be stabilised to remove unstable proteins. This is referred to as 'hot stabilisation'. In most cases this is achieved by the addition of bentonite.

To cold stabilise wine, tartrate is added to wine which is subsequently stored at low temperature for anywhere from a few days to several weeks. This is designed to reduce potassium and calcium levels, which can otherwise generally lead to haze formation in bottled products, especially sparking white wine.

There are disadvantages with this approach as follows:
(1) Bentonite usually creates large amounts of wine lees which leads to significant wine loss.
(2) Bentonite addition can damage wine quality and also cause problems with wine filtration.
(3) The present cold tartrate stabilisation practice is energy inefficient.
(4) Tartrate has a limited calcium removal capacity. Calcium tartrates, albeit insoluble, can form very slowly, so that under commercial conditions not all the calcium is necessarily removed with a standard treatment. Thus wine with high starting-levels of calcium is still at risk of forming precipitates and haze after bottling.

SUMMARY

We found that the addition of a carrageenan into grape juice prior to fermentation markedly improves wine stability. We also found that addition of a pectin into wine can remove calcium from wine in a linear, dose-dependent manner. We were interested in finding out whether we could devise a single treatment, based or these naturally occurring macromolecules, to affect cold and hot stabilisation simultaneously.

We found that a combination of a pectin and a carrageenan can be used for grape juice treatment prior to fermentation. The treatment can lower the calcium level in the white wine fermented from the treated juice by at least 20%. In addition the treatment markedly improves wine heat stability. This method can be used commercially to improve cold stabilisation and hot stabilisation of white wine.

According to the present invention there is provided a method for fining fermentable beverages comprising treating the beverage with a low methyl ester or low methoxy (LM) pectin having a degree of esterification (DE) of 50% or less and a carrageenan prior to fermentation.

Further according to the present invention there is provided a fining composition for treating a fermentable beverage comprising a low methyl ester or low methoxy (LM) pectin having a degree of esterification (DE) of 50% or less and a carrageenan.

The present invention also provides use of a low methyl ester or low methoxy (LM) pectin having a degree of esterification (DE) of 50% or less and a carrageenan as a fining composition for treating a fermentable beverage.

The present invention further provides a fermentable beverage which has been treated by a fining composition comprising a low methyl ester or low methoxy (LM) pectin having a degree of esterification (DE) of 50% or less and a carrageenan.

DETAILED DESCRIPTION

The present invention provides methods and compositions for fining fermentable beverages which involves the use of a low methyl ester or low methoxy (LM) pectin having a degree of esterification (DE) of 50% or less and a carrageenan.

Pectin

Pectins are polysaccharides having gelling properties, which are found in variable amounts in the primary cell walls and intercellular tissues of many plants. They are most abundant in fruits and vegetables, especially in the rinds of citrus fruits.

There are two main types of commercial pectins. Low methyl ester or low methoxy (LM) pectins having a degree of esterification (DE) of 50% or less and high methyl ester (HM) pectins having a DE of 50% or more. Due to their ability to bind calcium, LM pectins are preferred. LM pectins preferably have a DE of 0-35%, more preferably 7-25%, even more preferably 10-18%.

The (LM) pectins are divided into two sub-groups, i.e. conventional low methyl ester (LMC) pectin and amidated, low methyl ester (LMA) pectins. Both sub-groups are characterised by their ability to form gels in systems with low solids content and a wide pH range. Both types form gels in the presence of calcium. The DE (degree of esterification) and DA (degree of amidation) of pectins have an influence on the ability of pectins to form gels, since DE and DA determine the calcium reactivity of pectins.

LMA pectins are generally used to assist gelation in low-sugar fruit preparations, particularly in low-sugar jams and jellies. They are calcium sensitive and are consequently able to gel as a result of the calcium content in fruit. LMC pectins are more calcium reactive than LIA pectins and therefore more preferable for use in the present invention. LMC pectins are used in fruit yoghurt, ice cream ripple and similar products.

LM pectin is the partial methyl ester of 1,4-linked poly-alpha-D-galacturonic acid. The structure is complicated however by interruption with single 1,2-alpha-L-rhamnose residues. LM pectins will form firm calcium gels and the method of cross linking can be considered in terms of the 'egg-box' model, which requires cooperative binding of calcium ions between aligned polygalacturonate ribbons. The affinity towards calcium can be modified by amidation of the acid groups and by esterification—by changing charge and charge distribution. The affinity of pectin in solution will also be affected by pH, temperature and the concentration of sugars and macromolecules in solution.

The pectins used in the methods and compositions of the present invention may be commercially available and obtained "off the shelf" or prepared by the conventional processes of de-esterification or amidation of naturally occurring pectins, e.g. fruit pectins such as apple or citrus pectins, or root or tuber pectins such as beet, carrot or potato pectins, or sunflower pectins.

Commercially available pectins are termed "standardised pectins". These often contain about 20-50% sugars. Pectins without any added sugar are referred to as "active pectins". When referred to herein, the concentration of pectin in a calcium reducing agent, unless otherwise noted, refers to the concentration of standardised pectins, i.e. including any sugars.

It will be appreciated that natural and modified pectins may be used in the methods and compositions of the present invention. The pectins may be in the form of pectin salts such as metal salts for example alkali metal salts, in particular potassium or sodium salts.

While pectin may be added to the fermentable beverage in liquid or colloid suspension form, it has been found that the powder form of pectin is more effective. Soluble pectin can form stable micellar structures and enhance turbidity of the beverage.

A pectin solution may be prepared by dispersing the pectin in a suitable solvent such as distilled water. The pectin solution may contain other additives such as preservatives, for example, sodium metabisulfite.

Examples of pectin that can be used to lower the calcium in fermentable grape juice include CU-L 023/05, CU-L 024/05, TS 1580 and CB-L 038/06 preferably TS 1580 (DB=18%), CB-L 038/06 (DE=10%) (see Table 2 below).

The powdered pectin is preferably added in an amount that is effective to reduce calcium in the beverage. It has been found that the rate of calcium reduction is directly proportional to the pectin dosage rate.

When the amount of a component is expressed as a percentage, it will be appreciated that all the amounts of the components add up to 100%.

Any reference herein to wt/wt or w/w refers to a weight for weight relationship, i.e. x % wt/wt refers to x g of solid formulation in 100 g of the solid formulation.

Generally when expressed herein the % solution refers to the amount of pectin in the solution and not the other components. For example a 1% pectin solution will have 1 g of pectin in 100 ml. Other components may be present.

It will be appreciated that the amount of pectin added will depend on the type of pectin used. The preferred amount of pectin in the total fluid volume of the beverage is 0.2-5 g/L, more preferably 0.2-3 g/L.

The pectin used in the method of the invention is recyclable and may be reused after washing with an acid solution such as citric acid which may reduce the production costs.

Carrageenan

The carrageenan may be a cold water soluble type or a cold water insoluble type. Examples of a cold water soluble type carrageenan include iota-dominated carrageenans such as CSW-2 and CSM-2. Examples of a cold water insoluble type carrageenan include kappa-dominated carrageenans such as K-100 and X-106-03. The cold water soluble type carrageenans are more effective at improving hot stabilisation of the beverage as they have a much larger contact time with the fermentable beverage before gelling out unlike the cold water insoluble type carrageenans which form a gel very quickly.

The carrageenan may be added to the fermentable beverage in powder or in colloid suspension or solution form. A carrageenan solution may be prepared by dispersing the carrageenan in a suitable solvent such as distilled water to form, for example, a 2% w/v solution.

The preferred amount of carrageenan added to the fermentable beverage is 0.02 to 0.2 g/L in liquid form and 0.05 to 0.5 g/L in powder form.

Beverages

The present invention finds its major utility treating fermentable beverages, particularly fermentable alcoholic beverages such as beers, lagers, ales, cider, perry, spirit, liqueur and wine including still and sparkling wine. It may also find utility in alcopops and alcoholic fruit mixes. The level of alcohol, as measured by the amount of ethanol contained in the beverage can be 2.5 to 40%.

Additives

It will be appreciated that other additives may be used in the method of the invention. For example, small doses of up to 0-2 g/L, preferably 0.1 to 1.0 g/L of bentonite can be added in addition to the pectin and carrageenan to enhance the fining effect.

When carrageenan in solution form and optionally bentonite are added to the fermentable beverage, 0.3% sodium or potassium metabisulfite can also be added as a preservative. Preservatives may also be added with the pectin when it is in powder form.

Method

The pectin, carrageenan and optional additives, such as bentonite are added prior to fermentation.

The fermentable beverage is generally a fruit juice or fruit that has been subsequently crushed such as a grape juice when the beverage is wine. It can also be apple juice if the beverage is cider.

As described above, the pectin and carrageenan can be added to the fermentable beverage in powder or colloid suspension or solution form, preferably with stirring and then allowed to settle for a period of up to 72 hours at room temperature (22° C.). Yeast in an amount of, for example 200-400 mg/L is then added to the treated fermentable beverage and the beverage is allowed to ferment at room temperature until fermentation is complete, generally up to 10-14 days depending on the nature of the beverage. Alternatively, the pectin and carrageenan can be removed from the fermentable beverage such as fruit juice or fruit during racking.

The pectin, carrageenan and bentonite when present can be added using any suitable known technique such as manual dosing or by use of mechanical delivery systems such as an auger or an inline static mixer.

The addition of a pectin and a carrageenan prior to fermentation results in faster fermentation, removal of the majority of unstable proteins and a significant amount of calcium with no effect on alcohol production, volatile profile or loss of complexity. The fermented beverage which has been subjected to the pretreatment of the present invention has improved stability and has a lower prospect of forming haze after bottling.

DESCRIPTION OF THE DRAWINGS

In the Examples which follow, reference will be made to the accompanying drawings in which.

EXAMPLES

Figure 1:
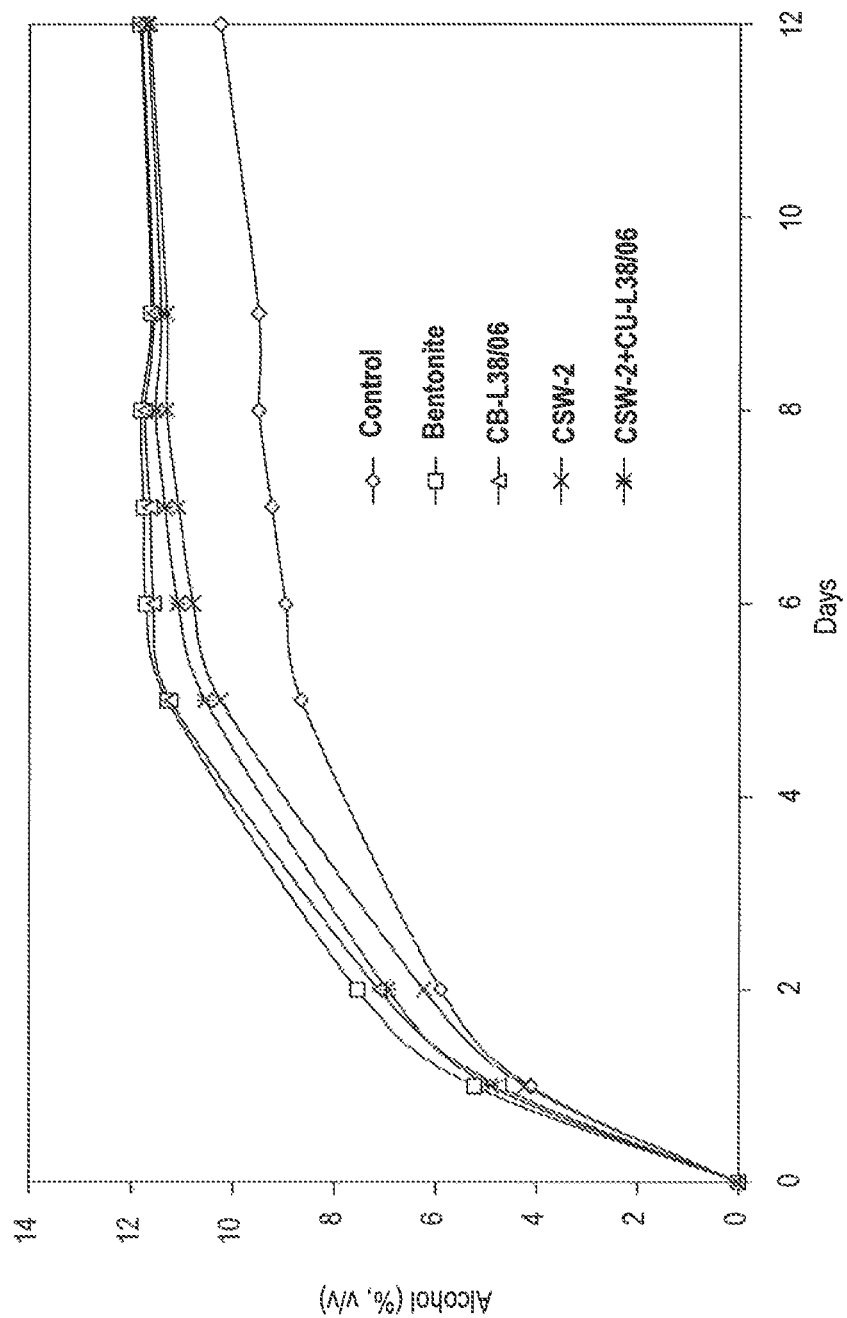
FIG. 1 is a graph showing the effect of juice treatment with bentonite, pectin and carrageenan on alcohol formation during wine fermentation. Fermentation was controlled at 16° C. for 12 days. Control was the fermentation without any addition. Bentonite was used as a positive control with dosage rate of 1 g/L. CB-L038/06 was dosed as powder form at 1.5 g/L in the grape juice and CSW-2 was dosed as 2% solution to 0.2 g/L in the juice in either individual dosage or the combination.

The present invention will now be described with reference to the following non-limiting examples.

In the examples, reference will be made to the following abbreviations:

| | |
|---|---|
| Ethyl acetate | ETOAC |
| Ethyl hexanoate | ETHEX |
| Ethyl octanoate | ETOCT |
| Phenyl ethyl acetate | PHETAC |
| Isoamyl acetate | IAMOAC |
| Total esters | TOTEST |
| n-propanol | NPROH |
| Isobutanol | IBUOH |
| Isoamyl alcohol | IAMOH |
| Phenyl ethyl alcohol | PHETOH |
| Total alcohol | TOTALC |
| Butanoic acid | BUT |
| Hexanoic acid | HEX |
| Octoanoic acid | OCT |
| Decanoic acid | DEC |
| Total acid | TOTACD |

Materials and Methods:
Raw Materials

The white chardonnay juices used in the examples were freshly supplied by Great Western Wineries, Victoria. The juices were either stored frozen or used immediately.

Dry wine yeast QA23 (Danstar Ferment AG, Switzerland) was used for the fermentation trials. The yeast was hydrated by addition of 10 volumes of distilled water at 35-40° C. for 20 min without shaking. Thereafter the slurry was mixed well prior to pitching.

A water-soluble type carrageenan (CSW-2) was supplied by CP Kelco. Copenhagen, Denmark. 2% CSW-2 solution was freshly prepared following the standard preparation protocol. The pectins CU-L024/05, CB-L038/06 and CU-L023/05, were supplied by Herbstreith & Fox Gmb, Nurnberg, Germany. They are non-amidated LMC citrus pectins. The DE of each pectin is 25%, 10% and 7% respectively. The pectin, TS1580 was supplied by CP Kelco (DE ~18%, trial lot).

Samples of juice, treated and untreated fermented juice and the final wine products (post-filtration) were collected and calcium concentration, alcohol, pH and volatiles were measured.

Estimation of Calcium and Other Metal Ions in Wine

Metal ions are measured by directly injecting 5 μl of wine sample into a HPLC (HP 1100) system equipped with a conductivity detector (Waters 432). A Universal cation column (100×4.6 mm×7μ) was used for separation.

Method for Wine Volatiles Analysis (GC-Headspace)

A gas chromatograph equipped with temperature programing, mass spectrometer, capillary/splitless injector port system, headspace auto-sampler and BP21 capillary column (25 m×0.32 mm×0.25μ) was used for the analyses. Approximately 2 g sodium chloride was added to headspace vials (10 ml); 3 mL of wine sample was injected into the headspace vials. The sample vial was immediately crimped shut, 10 μL of internal standard was injected. The volatiles were estimated by the CC/MS by comparison to the internal standard.

Method for Wine Heat-Stability Test

About 30 ml wine sample was filtered through a 0.45 μm syringe filter (Sartorius). The filtered sample was heated at 80° C. for 2 h and cooled down to 4° C. for another 2 h prior to turbidity measurement.

The turbidity of the heated samples was measured using a Hach turbidimeter (2100 AN) and is quoted as nephelometry turbidity units (NTU). The difference in the turbidity before and after heating should be, ideally, less than or equal to 2 NTU for stable wine.

Example 1—Suitable Carrageenans and Pectins for Wine Stabilisation

Carrageenan

Different types of carrageenan can have different water solubilities and also different protein binding capacities and affinities. The suitability of different carrageenans to treat white grape juice was assessed using the wine heat stability test. Fermentations were carried out in bench-top scale (500 ml) fermenters.

CSW-2, an iota-dominated carrageenan was dissolved in distilled water to 2% w/v at room temperature. K-100, a defined kappa-dominated carrageenan was hydrated in water at 60° C. to 2% w/v solution.

A LMC pectin, CB-L038/06 was also included in this example.

The carrageenan or pectin solution was mixed with the grape juice at room temperature (22° C. 200 mg/L) and stirred for 15 min.

The juice was transferred into a cylinder and allowed to settle at room condition for 16 h. The treated juice was then transferred in 1 L Schott bottles and freshly prepared yeast slurry was subsequently added to 200 mg dry weight yeast/L. The juice was allowed to ferment at 22° C. in the bottles for 10 days.

TABLE 1

Treatment of white grape juice with carrageenan and pectin. Fermentations were carried out in 1 L Schott bottles at 22° C. Ethanol concentration and wine stability were measured after 10 day fermentations. CSW-2 is cold water soluble carrageenan, K-100 is a commercial kappa-carrageenan and CB-L038/06 is a LMC pectin.

| | Control | CSW-2 (0.2 g/L) | K-100 (0.2 g/L) | CB-L038/06 (0.2 g/L) |
|---|---|---|---|---|
| Ethanol (%, v/v) | 12.2 | 12.6 | 12.4 | 12.7 |
| Heat-turbidity (NTU) | 49.0 | 4.6 | 8.9 | 31.4 |

Results after fermentation in Table 1 show that final ethanol production was not affected by carrageenan or pectin. In fact, fermentations with the treated juice were observed to be slightly faster than the control as well reaching slightly higher terminal ethanol concentration. The wine made from the pectin-treated juice was slightly more stable than control (NTU 31.4 versus 49.0). But the heat-stability test result was still well over the limit specified for packaged white wine product (2 NTU) However, the wines made with either of the carrageenan-treated juices were much more stable than either the control or the wine after pectin treatment. Carrageenan, CSW-2 treatment was the most effective. The turbidity of the (CSW-2) wine was only 4.6, the (K-100) wine was 8.9, ~90% and ~80% reduction respectively, over the control. CSW-2 (cold-water soluble type) was more effective than K-100 (cold water insoluble type) as K-100 will form a gel very quickly in cold grape juice (<10° C., pH~3.2). CSW-2 is a cold water soluble carrageenan and therefore will have a much longer contact time with juice proteins before gelling out of the juice.

Pectin

We previously found that some calcium-reactive LMC pectins, such as CU-L024/05 (DE=25%) will remove significant amounts of calcium from white wine when delivered in powder form. We were keen to determine whether this would happen in grape juice. Wine is different to grape juice because of the 12-14% ethanol content, but commercial grape juice is 'ethanol-free'.

Bench top fermenters were used to investigate the effects on fermentation and stability of combinatorial dosing of pectins and carrageenans into white grape juice. In the first instance, the ability of pectins to remove calcium from grape juice was tested.

Four LMC, calcium-reactive pectins were investigated. These pectins were chosen after a broaden review of pectin types, based on DE levels and calcium reactivity. Powder pectin was thoroughly dispersed into grape juice at 1 g/L at 10° C., using a magnetic stirrer to agitate for 15 min. The juice was allowed to settle at 4° C. for at least 16 h before samples were taken for calcium analysis. The results are shown in Table 2. Each pectin (1 g/L) was able to reduce juice calcium. CU-L024/05 was the least effective—at 15% reduction; CB-L038/06 was the best as it removed almost 23%.

These results show that pectins with DE levels ranging between 10-18% give the best calcium reduction rate in grape juice.

TABLE 2

The effect of pectin addition on calcium reduction from grape juice. Pectin was added to 1.0 g/L in the juice at 10° C. with agitation. ΔCa (%) indicates a percentage of calcium being removed from the juice.

|  | control | CU-L024/05 | TS1580 | CB-L038/06 | CU-L023/05 |
|---|---|---|---|---|---|
| Pectin DE (%) | — | 25 | 18 | 10 | 7 |
| Ca$^{2+}$ (mg/L) | 89 | 75 | 70 | 69 | 72 |
| ΔCa (%) | — | −15.7 | −21.3 | −22.5 | −19.1 |

Example 2—Effect of CSW-2 and CB-L038/06 Additions on Fermentation Rate and Alcohol Production CSW-2 and CB-L038/06 were selected for further fermentation trials (20 L level). Five fermenters were used. 2007 vintage chardonnay juice was treated with either CSW-2 (0.2 g/L), CB-L038/06 (1.5 g/L) or a combination of both. Untreated juice was the control. Bentonite (1 g/L) addition served as a positive control. Each juice was transferred into the fermenter immediately after treatment. It was chilled to 10° C. for 16 h before the hydrated wine yeast—QA23 was inoculated. Fermentation was controlled at 16° C. for 32 days.

FIG. 1 shows that the treated grape juice fermented faster than the control. Alcohol production after fermentation of treated juice was practically the same at 11.8% (v/v). Alcohol in the untreated juice was only 10.3% after 12 days. After 16 days it had almost reached 11.5% (not shown).

Example 3—Effect of CSW-2 and CB-L036/06 Grape Juice Treatment on Calcium, Volatiles and Wine Stability Calcium concentration during fermentation of treated grape juice were monitored at days 0, 6 and 12.

Figure 2:
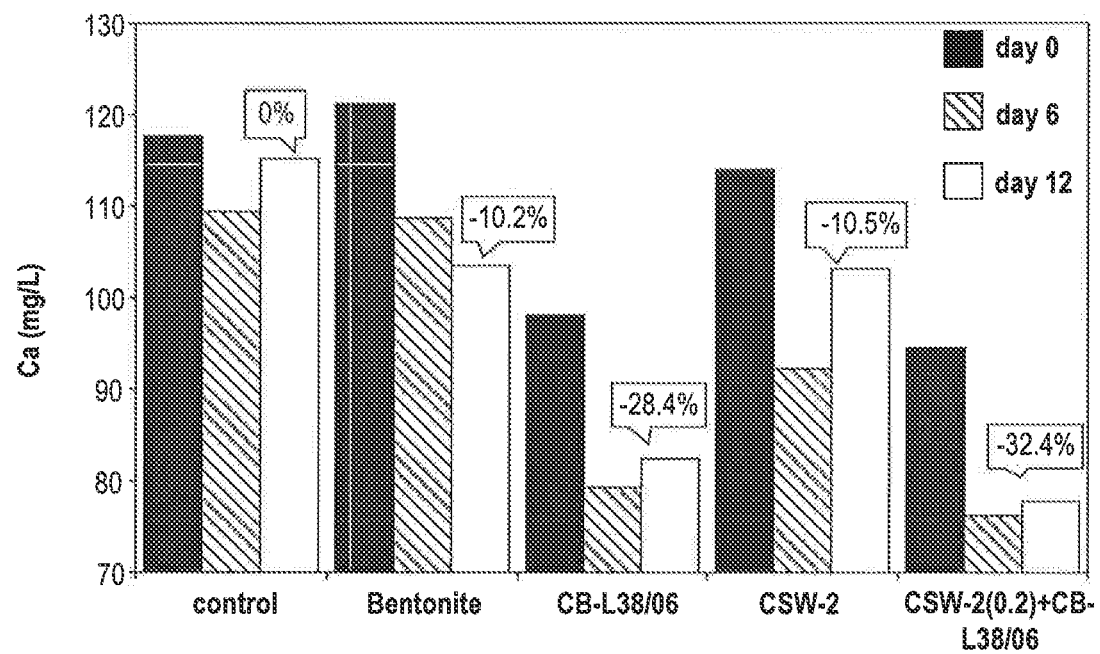
FIG. 2 is a graph showing wine calcium reduction during wine fermentation. Calcium concentration was analysed at day 0, day 6 and day 12 and compared to the control. The dosage rate and the method for addition of each additive are described in FIG. 1 above.

The calcium concentration in the untreated juice was >115 mg/L at the start of fermentation (FIG. 2). Addition of either bentonite or CSW-2 (carrageenan) did not reduce juice calcium. However, the addition of CB-L38/06 (alone or in combination with carrageenan) resulted in a significant drop in juice calcium. An even more obvious calcium reduction occurred in the finished wine which showed a 28.4% reduction with pectin alone and 32.4% in combination with carrageenan. This is presumably because pectin gelation/precipitation in wine is more effective because of the alcohol.

Bentonite and carrageenan both reduced calcium by ~10% after fermentation, which is still significant.

Figure 3:
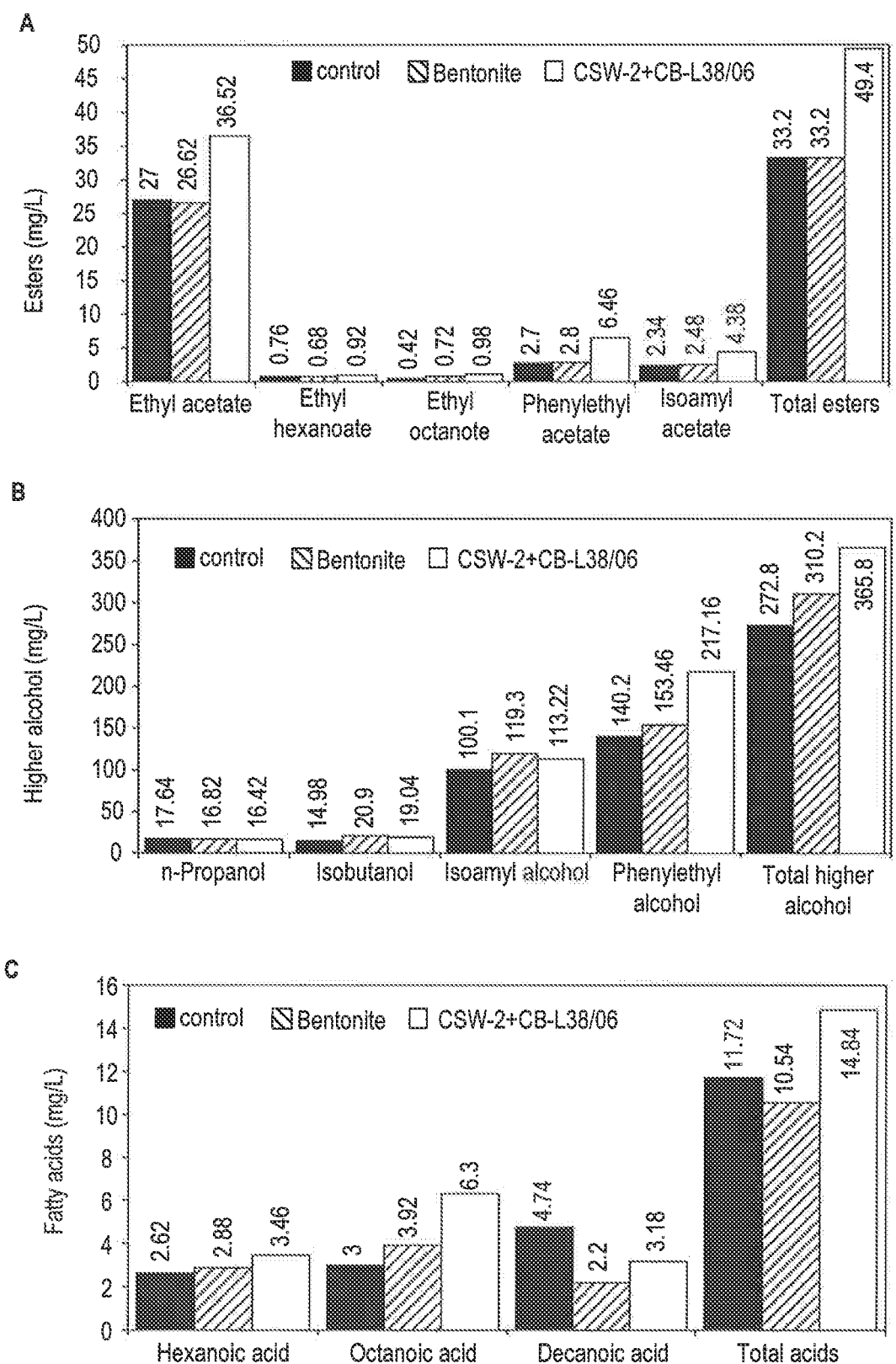
FIG. 3 is a graph showing changes in wine volatiles after 12 day fermentations of untreated, and bentonite- or carrageenan+pectin-treated juice. Figures A, B and C show esters, higher alcohols and acids formation. The dosage rates and the method for addition of each additive is described in FIG. 1 above.

Wine volatiles (esters, higher alcohols and acids) were monitored during fermentation. The esters (FIG. 3A) in the CSW-2 and CB-L038/06 wines increased by >21% (ethyl hexanoate) up to 140% (phenylethyl acetate). This adds up to a 49% increase in total ester production. In bentonite treated juice, ethyl hexanoate production dropped by 11% but ethyl octanote production increased by 71%. Overall there was no change in total ester production with bentonite-treated grape juice.

Carrageenan and pectin co-treatment led to an increase in most higher alcohols (FIG. 3B) except n-propanol, which dropped slightly by 7%. Total higher alcohol production was up by 34%, compared to ~14% for bentonite treated juice. Again the carrageenan-pectin co-treatment resulted in a 110% increase in octanoic acid, but a 33% drop in decanoic acid level. Overall total acids increased by 27%. In bentonite-wine total acids were down by 10%.

The wines were also evaluated by a house sensory panel. 8 out of 9 testers preferred the wine that was made from the carrageenan-pectin co-treated juice. It was considered fruiter and truer to 'chardonnay-type'.

In contrast, although the chemical data indicated that bentonite treatment did not markedly affect wine volatiles, the panel thought this wine was thin and a bit 'earthy'. Bentonite did strip out colour compared to the control whereas the other treatments did not (Table 3).

TABLE 3

Changes in wine pH and colour caused by the juice treatments.

|  | control | Bentonite | CSW-2 + CB-L38/06 |
|---|---|---|---|
| pH | 3.6 | 3.5 | 3.6 |
| Colour (EBC unit) | 2.4 | 1.5 | 2.3 |

Heat Stability

Figure 4:
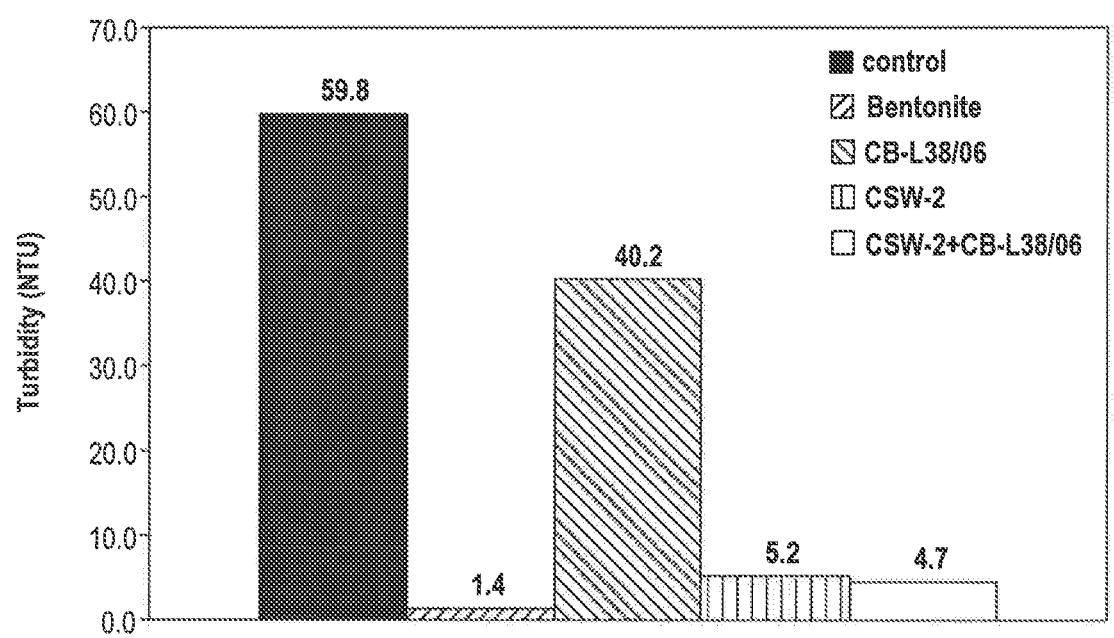
FIG. 4 is a graph showing changes in wine stability after 12 day fermentation using the treated juice.

Wines were chilled to 4° C. and incubated for 5 days, filtered through a Millipore glass fibre filter and then assessed for heat-stability. The control wine was ~60 NTU (FIG. 4), CB-L038/06-wine gave a value of 40 NTU. This is far from a 'significant' improvement. Carrageenan (CSW-2)

treatment of juice produced a very low NTU result in the wine—down to 5.2, with pectin+carrageenan this dropped to 4.7. Wine makers in Australia typically aim for a value of 2 or less. Bentonite (1.0 g/L)-wine tested at 1.4 NTU, is well below this value.

This example shows that grape juice treatment may be a more convenient, simpler way to stabilize wine than current practice, which treats wine after the fermentation is complete. Bentonite by itself has a very limited ability to remove calcium from wine, when added either pre- or post-fermentation. Pectin stands out as a very effective agent for calcium removal.

In combination with carrageenan it appears to be slightly more effective. Carrageenan removes protein yet has almost no negative effects on volatile levels. Bentonite is even Letter at protein removal, thus carrageenan in combination with a very low dose of bentonite ought to achieve <2 NTU in the heat test without any, or little effect on wine volatiles. A combination of bentonite, carrageenan and pectin may be the best 'recipe' for wine stabilization. It also provides plenty of scope for wine maker versatility.

Example 4—Effect of Bentonite Addition During Grape Juice Treatment on Wine Stability Past practice has invariably been about treatment of wine with soluble macromolecules. This requires the use of dosing pumps and associated equipment that adds cost and complexity to wine making and limits the application to medium or large wineries. Even then it may not be considered financially justified. Therefore as well as assessing soluble process aids, we have looked for macromolecules that are equally effective when introduced as the powder. This creates far more versatile products and more simple ease of application.

Such a combination for the treatment of grape juice is described in the following section. Bentonite (0.4 g/L) was combined with carrageenan CSW-2 (0.1 g/L) and pectin TS1580 (1.0 g/L). The powder mixture was used to treat grape juice that was subsequently used for laboratory benchtop fermentations. Untreated juice and a mixture without bentonite (CSW-2+TS1580) were used as controls. The mixtures were added to the juices thoroughly in 1 L Schott bottles for 15 min before allowing the samples to settle at 4° for at least 16 h. 0.2 g/L dry wine yeast QA23 was then hydrated in distilled water and inoculated into each bottle. Fermentation was then allowed to proceed at room temperature (22° C.) for 10 days.

The results (Table 4) show that volatile formation in treated juices increased significantly compared to the control, as expected. Final pH, alcohol level and wine colour were not changed however. Wine calcium concentration in the treated wines was about 25% lower compared to the control. Sodium concentration in both cases was up from 12 mg/L to 84-85 mg/L. This is still within the acceptable range for Australian white wine. Importantly, both treatments produced more stable wines. The control wine scored 32 NTU in the heat test. The (pectin+carrageenan)-wine scored 5.8 NTU. The wine made from grape juice treated with pectin, carrageenan and bentonite was 2.7 NTU. This indicates that a one-step process would be feasible to replace the post fermentation use of a high dose of bentonite for heat stabilisation. Bentonite+CSW-2+TS1580 treatment, is one such option.

TABLE 4

Effects of grape juice treatment on wine volatiles formation, chemicals and physical properties.

| | | 1 | 2 | Diff (+/− %) | 3 | Diff (+/− %) |
|---|---|---|---|---|---|---|
| Esters | Ethyl acetate | 28.00 | 39.80 | 42.1 | 41.20 | 47.1 |
| | Ethyl hexancate | 0.42 | 0.92 | 119.0 | 0.96 | 126.6 |
| | Ethyl actanote | 0.44 | 0.72 | 63.6 | 0.76 | 72.7 |
| | Phenylethyl acetate | 0.28 | 0.60 | 114.3 | 0.62 | 121.4 |
| | Isoamyl acetate | 0.96 | 1.96 | 104.2 | 2.18 | 127.1 |
| higher | n-Propanol | 53.60 | 53.20 | −0.7 | 52.80 | −1.5 |
| | Isobutanol | 31.80 | 43.20 | 35.8 | 42.20 | 32.7 |
| | Isoamyl alcohol | 118.60 | 125.80 | 6.1 | 126.00 | 6.2 |
| | Phenylethyl alcohol | 38.00 | 35.00 | −7.9 | 35.00 | −7.9 |
| fatty acids | Hexanoic acid | 2.50 | 5.08 | 103.2 | 5.56 | 122.4 |
| | Octanoic acid | 4.28 | 7.08 | 65.4 | 7.56 | 76.6 |
| | Decanoic acid | 1.14 | 1.62 | 42.1 | 1.80 | 57.9 |
| | alcohol (v/v, %) | 10.43 | 10.71 | 2.7 | 10.73 | 2.9 |
| | pH | 3.42 | 3.42 | 0.0 | 3.42 | 0.0 |
| | Colour | 1.60 | 1.70 | 6.3 | 1.70 | 6.3 |
| Ions | $Ca^{2+}$ | 98.00 | 74.00 | *−24.5* | 72.00 | *−26.5* |
| | $Na^+$ | 12.00 | 85.00 | 608.3 | 84.0 | 600.0 |
| | Heated Haze | 32.00 | 5.8 | *−82.0* | 2.7 | *−91.5* |

1: untreated control,
2: CSW-24 + TS1580 and
3: bentonite + CSW-2 + TS1580.
Diff. (+/− %) indicates changes between the test and the control.
Increase by 10% or more is highlighted in bold while decrease by 10% or more is hiebliahted in italics.

CONCLUSION

Fermented beverages such as wine have exceptional complexity. Post-fermentation treatments to achieve heat and cold stabilization generally do influence wine flavour characteristics.

The stabilization of fermentable beverages such as grape juice in the case of wine is a different way of approaching beverage stabilisation. The point of adding pectin into grape juice, may seem counterintuitive, when treatment with pectinase is frequently used to avoid filtration problems downstream after fermentation. Macromolecular processing aids, are generally added as solutions or colloidal suspensions, which can be problematic, as this requires dosing and delivery equipment that adds to overheads, and limits the uptake of new technology. Dedicated systems usually lead to some loss of plant flexibility.

The method and composition of the present invention reduce some of these problems. Carrageenan and pectin are 'generally regarded as safe (GRAS)' ingredients. Pectin occurs naturally in all plants, and although differences in structural complexity occur, the general structure of this polygalacturonic acid is the same. Carrageenan is also a food processing aid that is recovered in commercial quantities from marine plants. Powder mixtures of pectin and carrageenan can be dosed by manual addition, or by auger, or other mechanical delivery systems.

There are potential benefits for using these beverage pre-treatments. It has been found that the fermentations are faster, the final ferments are clearer, while there appears no change of volatile profile, no loss of complexity using these treatments. Pectin, carrageenan and bentonite are traditional food ingredients. The stoichiometry of the mixture can be varied readily depending on the molecular "targets", and/or cations to be removed. The addition of these macromolecules does not detract from the art of the wine maker, from his or her implicit skills, and mystery of the process.

Climate change effects are predicted to increase in the short term. Calcium accumulation in fruit is just one of the consequences of climate changes, probably brought on as plants optimize osmotic gradients for water accumulation. There is also likely to be a change in the residual protein level in grape juice and possibly an increase in the recalcitrant character of some of these proteins. Effective removal of heat-sensitive protein and the optimization of premium wine capacity from all vintages will be very important as fruit yields decline as hydrotherms move north and south, and affect the traditional vine growing districts.

The method and composition of the present invention will promote fruiter wines, more stable wine, and eliminate, at least largely diminish the waste production in wine making, which again is a critical profitability issue for marginal producers.

Addition of a mixture of pectin and carrageenan into a fermentable beverage such as grape juice removes the majority of unstable proteins and a significant amount of calcium. Wine calcium can be controlled by dosing appropriate levels of pectin in grape juice. Wines made from the treated juice are fruiter with a fuller body. Wine stability is also significantly improved by the treatment. Therefore wine may only require a 'polishing' process or even no further stabilization treatment when treated by the method of the present invention.

Example 4—Vintage Trials with Chardonnay and Sauvignon Blanc

Vintage trials were carried out with Chardonnay and also Sauvignon Blanc juice to evaluate the effect of pectin and carrageenan treatment on bentonite requirement. In addition the effects of these treatments on wine volatiles were compared, together with the fermentation rates for the treated and untreated juice. In this example, the calcium levels were below the vintage maximum threshold for calcium, and consequently the treatments were not designed to reduce the final calcium levels after fermentation by a significant margin.

The following trials used Chardonnay grapes grown in the Victorian Central highland district and Sauvignon Blanc grapes also grown in this region.

Vintage 2008
Trial 1

Grapes were harvested, and treated according to the conditions described below. In Part A, the carrageenan solution and pectin powder were added to the Chardonnay grape juices, with mild agitation of the demijohn containers. In Part B, pectin powder (TS 1580) and carrageenan (CSW-2) solution were added directly to the grapes (45 kg), mixed manually to get an even distribution, and subsequently crushed using a small, hand-operated press.

In Part A the flowing treatments were set up:
Control A—no pectin or carrageenan addition.
Treatment 1A—Addition of 1.5 g/L pectin (powder form) and 0.150 g/L carrageenan (liquid) and incubation for 30 min before the addition of pectinase and chilling (duplicate).
Treatment 2 A—Addition of 1.5 g/L pectin and 0.150 g/L carrageenan and incubation for 1 hour before pectinase addition and chilling (duplicate).
Treatment 3A—Addition of 1.5 g/L pectin and 0.150 g/L carrageenan and incubation for 2 hours before pectinase addition and chilling (duplicate).

Samples for yeast available nitrogen (YAN) analysis were collected prior to pectinase addition and analysed by digestion of the sample with arginase and urease to liberate ammonia. The ammonia is quantitated using an enzymation protocol in which NADPH coenzyme formation is measured Spectrophotometrically during conversion of 2-oxoglutarate to L-glutamate in the presence of glutamate dehydrogenase.

In Part B the following tests were set up:
Control B—no pectin or carrageenan addition.
Treatment 1B—Addition of 1.5 g/L pectin and 0.150 g/L carrageenan to 45 kg of fruit followed by the usual mix and crush and processing.
Treatment 2B—Addition of 1.5 g/L pectin and 0.150 g/L carrageenan to 45 kg of fruit and hand-mix in, then incubation for 1 hour before processing as per normal.
Treatment 3B—Addition of 1.5 g/L pectin and 0.150 g/L carrageenan to 45 kg of fruit and mix in then incubation for 2 hours, prior to processing as per normal.

Following incubation, 30 ppm (0.4 ml) pectinase was added and the demijohns were placed at 4° C. for settling for 18 hours before decanting.

EC1118 yeast (300 mg/L) was inoculated into the juice once the demijohns were warmed to 16° C.

Fermentation was between 18-20° C. and the fermentation rate was monitored by measuring Bé. The final Bé was 0. Once each ferment was finished, it was placed at 4° C., 60 mg/L $SO_2$ was added and it was allowed to settle. The wine was racked and bottled under screw caps for general quality analysis, including metal ions, volatiles and heat stability.

TABLE 3

Treatment data for Trial 1, Part A and Part B. The Chardonnay juices were treated by a combination of carrageenan solution and pectin powder and settled at 4° C. for 16 h. Wine yeast EC1118 was inoculated into the juice and then fermented at ambient (20° C.) temperature for 7 days.

| Trial code | Demijohn (DJ) No. | Juice treated (L) | Volume after racking (L) | 10% EC1118 added (ml) | Additional information |
|---|---|---|---|---|---|
| Part A Chardonnay grape juice | | | | | |
| Control 1A | D13 | 12 | 9.5 | 30 | Bé 10.8, |
| Control 2A | D14 | 12 | 9.3 | 30 | pH 3.37, |
| | | | | | TA 7.2, |
| | | | | | YAN 217 |
| | | | | | $FSO_2$ 8 mg/l |
| T 1A | D9 | 12 | 9.6 | 30 | |
| | D10 | 12 | 9.25 | 30 | |
| T 2A | D11 | 12 | 8.8 | 30 | |
| | D16 | 12 | 8.4 | 30 | |
| T 3A | D17 | 12 | 8.6 | 30 | YAN 206 |
| | D18 | 12 | 8.25 | 30 | |
| Part B Grape - crash - juice collected | | | | | |
| Control B | D29 | 12 | 10.0 | 30 | |
| T 1B | D30 | 12 | 8.5 | 30 | |
| T 2B | D27 | 12 | 9.0 | 30 | |
| T 3B | D28 | 12 | 8.85 | 30 | |

TABLE 4

Fermentation data for Trial 1, Part A and Part B

| | | Day 1 | | Day 4 | | Day 7 | |
|---|---|---|---|---|---|---|---|
| | DJ No. | Bé | Temp | Bé | Temp | Bé | Temp |
| Juice | | | | | | | |
| Control A | 13 | 10.8 | 16 | 4.8 | 23 | 0 | 20 |
| | 14 | 10.8 | 16 | 4.4 | 23 | 0 | 20 |

TABLE 4-continued

Fermentation data for Trial 1, Part A and Part B

| | | Day 1 | | Day 4 | | Day 7 | |
|---|---|---|---|---|---|---|---|
| | DJ No. | Bé | Temp | Bé | Temp | Bé | Temp |
| 1A | 9 | 10.8 | 16 | 4.6 | 23 | 0 | 20 |
| | 10 | 10.8 | 16 | 4.6 | 23 | 0.2 | 20 |
| 2A | 16 | 10.8 | 16 | 4 | 23 | 0 | 20 |
| | 11 | 10.8 | 16 | 4.6 | 23 | 0.4 | 20 |
| 3A | 17 | 10.8 | 16 | 4.2 | 23 | 0.2 | 20 |
| | 18 | 10.8 | 16 | 4.2 | 23 | 0 | 20 |
| Fruit | | | | | | | |
| Control B | 29 | 11 | 16 | 5.6 | 23 | 0.4 | 20 |
| 1B | 30 | 11 | 16 | 5.4 | 23 | 0.2 | 20 |
| 2B | 2 | 11 | 16 | 4.8 | 23 | 0 | 20 |
| 3B | 28 | 11 | 16 | 5.8 | 23 | 0.2 | 20 |

Table 4 records the changes in sugar levels (Bé) during the 7 day fermentation for Part A (addition to grape juice). After Day 4, the Bé values for the control and for T1A, 2A and 3A (Chardonnay, pectin and carrageenan, 0.5, 1 and 2 h incubation) were very similar. And after 7 days it was concluded that the differences in residual sugar were not significant. Similarly the fermentation rate for Part B (pectin and carrageenan to grapes) showed no major difference at Day 4 and Day 7.

TABLE 5

Volatile analysis for wine made in Trial 1, Part A and Part B

| | Control A | 1A | 2A | 3A | Control B | 1B | 2B | 3B |
|---|---|---|---|---|---|---|---|---|
| ETOAC | 38.1 | 43.1 | 41.0 | 41.0 | 38.4 | 40 | 41.6 | 45.7 |
| ETHEX | 1.0 | 1.2 | 1.2 | 1.1 | 1.16 | 1.12 | 1.08 | 1.14 |
| ETOCT | 1.0 | 1.2 | 1.1 | 1.0 | 1.1 | 1.05 | 0.84 | 1.06 |
| PHETAC | 0.3 | 0.4 | 0.3 | 0.3 | 0.38 | 0.41 | 0.38 | 0.41 |
| IAMOAC | 3.1 | 3.7 | 3.2 | 3.0 | 3.06 | 3.14 | 3.26 | 3.89 |
| TOTEST | 43.5 | 49.6 | 46.8 | 46.4 | 44.1 | 45.7 | 47.2 | 52.2 |
| NPROH | 44.0 | 43.4 | 42.1 | 40.7 | 37.6 | 40.5 | 37.5 | 45.0 |
| IBUOH | 19.5 | 19.3 | 19.7 | 19.5 | 18.2 | 19.0 | 19.7 | 19.6 |
| IAMOH | 132.8 | 122.4 | 122.4 | 123.8 | 129.2 | 120.4 | 132 | 120.8 |
| PHETOH | 28.1 | 23.4 | 24.0 | 24.1 | 29.6 | 28.1 | 29.4 | 24.1 |
| TOTALC | 224.4 | 208.2 | 208.1 | 208.0 | 214.6 | 208 | 218.6 | 209.7 |
| BUT | 1.5 | 1.7 | 1.6 | 1.6 | 1.5 | 1.4 | 1.5 | 1.4 |
| HEX | 4.9 | 5.6 | 5.4 | 5.0 | 5.0 | 5.1 | 4.5 | 5.0 |
| OCT | 9.0 | 10.6 | 9.9 | 9.3 | 9.7 | 9.2 | 8.5 | 9.0 |
| DEC | 3.1 | 3.8 | 3.6 | 3.2 | 3.4 | 3.4 | 2.7 | 3.4 |
| TOTACD | 18.5 | 21.9 | 20.7 | 19.4 | 19.9 | 19.6 | 17.5 | 19.1 |
| Alc (%) | 11.1 | 11.1 | 11.1 | 11.0 | 11.2 | 11.2 | 11.0 | 11.4 |

TABLE 6

The percentage changes in volatiles for Trial 1, Part A and Part B (cf. Table 7)

| % | Control A | 1A | 2A | 3A | Control B | 1B | 2B | 3B |
|---|---|---|---|---|---|---|---|---|
| ETOAC | 0 | 13.3 | 7.8 | 7.6 | 0.0 | 4.2 | 8.3 | 19.0 |
| ETHEX | 0 | 19.9 | 14.1 | 7.3 | 0.0 | −3.4 | −6.9 | −1.7 |
| ETOCT | 0 | 14.3 | 10.8 | 3.0 | 0.0 | −4.5 | −23.6 | −3.6 |
| PHETAC | 0 | 12.3 | 0.0 | −6.2 | 0.0 | 7.9 | 0.0 | 7.9 |
| IAMOAC | 0 | 19.4 | 4.1 | −2.9 | 0.0 | 2.6 | 6.5 | 27.1 |
| TOTEST | 0 | 13.9 | 7.6 | 6.7 | 0.0 | 3.6 | 7.0 | 18.4 |
| NPROH | 0 | −1.4 | −4.3 | −7.6 | 0.0 | 7.7 | −0.3 | 19.7 |
| IBUOH | 0 | −1.0 | 0.8 | −0.3 | 0.0 | 4.4 | 8.2 | 8.8 |
| IAMOH | 0 | −8.0 | −7.9 | −6.8 | 0.0 | −6.8 | 2.2 | −6.5 |
| PHETOH | 0 | −16.9 | −14.8 | −14.4 | 0.0 | −5.1 | −0.7 | −18.6 |
| TOTALC | 0 | −7.2 | −7.3 | 7.3 | 0.0 | −3.1 | 1.9 | −2.3 |
| BUT | 0 | 12.2 | 5.8 | 7.5 | 0.0 | −1.4 | 0.7 | −5.4 |
| HEX | 0 | 14.0 | 10.2 | 2.8 | 0.0 | 2.6 | −9.5 | 1.6 |
| OCT | 0 | 17.9 | 10.2 | 3.7 | 0.0 | −4.4 | −12.0 | −7.3 |
| DEC | 0 | 23.9 | 15.5 | 3.9 | 0.0 | 0.0 | −20.9 | 0.6 |
| TOTACD | 0 | 16.6 | 10.1 | 3.3 | 0.0 | −1.8 | −11.7 | 3.8 |

The wine volatile data for Part A and B wines showed variations in some volatiles. The total esters in absolute figures do not show major differences. Pre-treatment with pectin and carrageenan of grape juice (1A, 2A and 3A) increased the total esters by about 10%. Likewise the pre-treatment of grapes elevated total esters by about the same amount. Higher alcohols decreased slightly. Total acids increased slightly. If the percentage changes are compared (Table 6), the changes are as follows: pre-treatment of grape juice (Part. A) enhances total esters up to 14%; pre-treatment of grapes (Part B) increases esters by up to 18%. Total higher alcohols (Part A vs B, Table 8) dropped by slightly over 7% and 3% respectively. Total acids were up, 16.6% maximum, and down 11.7% maximum for Part A and B respectively.

This is different in magnitude to the laboratory data using grape juice, ie. equivalent to Part A in this study. The percentage changes in the laboratory ferments were over 100% for some esters. The higher alcohols and the fatty acids also increased significantly. There are a number of reasons why this may occur—juice prior history, fresh versus stored juice, the effects of fermenter geometry and so on. However it is clear that pectin plus carrageenan treatment has the potential to change the flavour volatiles of wine, which the wine maker may use to manipulate, or create or enhance flavour characteristics.

TABLE 7

Wine heat stability result for Trial 1, Part A and Part B

| | Demi no. | | | | | | | | | | | |
|---|---|---|---|---|---|---|---|---|---|---|---|---|
| | 13 | 14 | 9 | 10 | 16 | 11 | 17 | 18 | 29 | 30 | 27 | 28 |
| Heat test (2 h) | 36.7 | 36 | 44.1 | 43.4 | 43.9 | 44.4 | 42.8 | 39.2 | 52.6 | 36.1 | 32.4 | 31.4 |
| Bentonite test (ppm) | 800 | 800 | 400 | 400 | 500 | 400 | 400 | 400 | 800 | 400 | 400 | 400 |

Heat stability of these ferments was tested as shown in Table 7. The control wine requires 800 mg/L of bentonite, whereas the treated wines only needed 400 mg/L in all cases apart from one (T2A); all other 8 test wines were equivalent.

Trial 2

Trial 1, Part A protocol was repeated with Sauvignon Blanc juice. However 2 additional conditions were included: in T2D and 2E carrageenan powder replaced carrageenan solution. The tests were set up as follows:

Control—no pectin or carrageenan

Treatment 2A—Addition of 1.5 g/L pectin (powder) and 0.150 g/L carrageenan and incubation for 1 minute before pectinase addition and chilling (duplicate).

Treatment 2B—Addition of 1.5 g/L pectin (powder) and 0.150 g/L carrageenan and incubation for 10 minutes before pectinase addition and chilling (duplicate).

Treatment 2C—Addition of 1.5 g/L pectin (powder) and 0.150 g/L carrageenan and incubation for 30 minutes before pectinase addition and chilling (duplicate).

Treatment 2D—Addition of 1.5 g/L pectin (powder) and 0.250 g/L carrageenan and incubation for 10 minutes before pectinase addition and chilling (duplicate).

Treatment 2E—Addition of 1.5 g/L pectin (powder) and 0.250 g/L carrageenan and Incubation for 30 minutes before pectinase addition and chilling (duplicate).

Pectin and carrageenan were vigorously mixed with juice using a hand-held, electric impeller, according to the plan above. Pectinase (400 ul in 12 L) was subsequently added and the demijohns were placed at 4° C. for settling for 16 hours. Once settled, all treatments were racked, then allowed to warm to 16° C. and inoculated with EC1118 yeast at 200 mg/L. The juices were finally fermented and bottled according to the Trial 1 protocol.

TABLE 8

Treatment data for Trial 2. The Sauvignon Blanc juices were treated by a combination of carrageenan solution and pectin powder in T2A, 2B and 2C whereas in T2D and 2E, carrageenan solution was replaced by carrageenan powder. After the treatment the juices were settled at 4° C. for 16 h. Wine yeast EC1118 was inoculated into the juices and then fermented at ambient (20° C.) temperature for 7 days.

|  | DJ No. | Initial Volume (L) | Racked Volume (L) | Juice data |
|---|---|---|---|---|
| Control | 10 | 12 | 10.50 | pH 3.24 |
|  | 20 | 12 | 10.60 | TA 10.7 |
| T2A | 3 | 12 | 10.15 | Bé 11 |
|  | 8 | 12 | 10.05 | YAN 307 |
| T2B | 2 | 12 | 10.25 | SO$_2$ 30 |
|  | 7 | 12 | 10.15 |  |
| T2C | 4 | 12 | 10.40 |  |
|  | 6 | 12 | 10.40 |  |
| T2D | 5 | 12 | 10.35 |  |
|  | 14 | 12 | 10.30 |  |
| T2E | 18 | 12 | 10.30 |  |
|  | 11 | 12 | 10.40 |  |

TABLE 9

Fermentation data for Trial 2 after Day 7

| DJ No. | RS | FSO$_2$ | TSO$_2$ | pH | TA | Alc | VA |
|---|---|---|---|---|---|---|---|
| 10 | 0.25 | 36 | 131 | 3.14 | 10.2 | 10.9 | 0.13 |
| 20 | 0.09 | 33 | 161 | 3.14 | 10.6 | 10.8 | 0.22 |
| 3 | 0.24 | 29 | 136 | 3.17 | 10.4 | 10.9 | 0.34 |
| 8 | 0.29 | 35 | 134 | 3.18 | 10.0 | 10.9 | 0.20 |
| 2 | 0.34 | 26 | 130 | 3.20 | 10.0 | 10.9 | 0.24 |
| 7 | 0.20 | 33 | 149 | 3.19 | 10.1 | 10.8 | 0.44 |
| 4 | 1.51 | 29 | 153 | 3.17 | 10.3 | 10.9 | 0.37 |
| 6 | 0.20 | 36 | 140 | 3.18 | 10.1 | 10.9 | 0.19 |
| 5 | 0.30 | 29 | 129 | 3.19 | 10.1 | 10.9 | 0.23 |
| 14 | 0.25 | 36 | 137 | 3.19 | 10.1 | 11.0 | 0.28 |
| 18 | 0.29 | 35 | 133 | 3.18 | 10.1 | 10.9 | 0.14 |
| 11 | 0.21 | 37 | 149 | 3.18 | 10.1 | 10.9 | 0.35 |

TABLE 10

Wine analysis and the percentage changes in volatiles for Trial 2

|  | Control | 2A | 2B | 2C | 2D | 2E | % 2A | 2B | 2C | 2D | 2E |
|---|---|---|---|---|---|---|---|---|---|---|---|
| ETOAC | 40.55 | 41.45 | 45.80 | 42.65 | 45.35 | 45.70 | 2.2 | 12.9 | 5.2 | 11.8 | 12.7 |
| ETHEX | 0.98 | 0.82 | 0.78 | 0.96 | 0.87 | 1.02 | −15.9 | −20.5 | −2.1 | −10.8 | 4.1 |
| ETOCT | 0.94 | 0.79 | 0.79 | 0.86 | 0.86 | 0.87 | −16.0 | −16.0 | −8.5 | −9.0 | −8.0 |
| PHETAC | 0.55 | 0.56 | 0.64 | 0.47 | 0.59 | 0.45 | 2.8 | 16.5 | −14.7 | 8.3 | −17.4 |
| IAMOAC | 3.67 | 3.59 | 4.67 | 3.87 | 4.40 | 3.66 | −2.2 | 27.1 | 5.3 | 19.9 | −0.3 |
| TOTEST | 46.65 | 47.20 | 52.65 | 48.80 | 52.05 | 51.65 | 1.2 | 12.9 | 4.6 | 11.6 | 10.7 |
| NPROH | 32.70 | 26.25 | 20.65 | 29.65 | 26.90 | 35.30 | −19.7 | −36.9 | −9.3 | −17.7 | 8.0 |
| IBJOH | 20.40 | 20.50 | 22.50 | 17.80 | 20.90 | 19.15 | 0.5 | 10.3 | −12.7 | 2.5 | −6.1 |
| IAMOH | 142.65 | 137.80 | 131.20 | 130.90 | 130.30 | 133.35 | −3.4 | −8.0 | −8.2 | −8.7 | −6.5 |
| PHETOH | 30.75 | 31.25 | 25.35 | 24.60 | 24.60 | 25.00 | 1.6 | −17.6 | −20.0 | −20.0 | −18.7 |
| TOTALC | 226.50 | 215.80 | 199.70 | 202.95 | 202.70 | 212.80 | −4.7 | −11.8 | −10.4 | −10.5 | −6.0 |
| BUT | 1.29 | 1.40 | 1.21 | 1.43 | 1.34 | 1.56 | 8.1 | −6.6 | 10.5 | 3.5 | 20.5 |
| HEX | 5.01 | 4.84 | 4.59 | 5.07 | 4.84 | 5.25 | −3.4 | −8.5 | 1.2 | −3.4 | 4.7 |
| OCT | 9.81 | 8.90 | 8.61 | 9.38 | 9.44 | 10.22 | −9.3 | −12.2 | −4.4 | −3.8 | 4.1 |
| DEC | 3.24 | 2.58 | 2.58 | 2.95 | 2.94 | 2.96 | −20.4 | −20.5 | −9.0 | −9.4 | −8.6 |
| TOTACD | 19.82 | 18.14 | 17.38 | 19.20 | 18.93 | 20.39 | −8.5 | −12.3 | −3.2 | −4.5 | 2.9 |

Volatile data showed the sane trends as before: ie. esters increased, higher alcohols slightly decreased and total acids slightly decreased.

TABLE 11

Heat stability data for Trial 2

| | DJ No. | | | | | | | | | | | |
|---|---|---|---|---|---|---|---|---|---|---|---|---|
| | 10 | 20 | 3 | 8 | 2 | 7 | 4 | 6 | 5 | 14 | 18 | 11 |
| Heat test (2 h) | 67.4 | 61.8 | 49.7 | 28.0 | 49.0 | 43.7 | 52.8 | 45.3 | 41.1 | 33.1 | 19.8 | 24.4 |
| Bentonite test (ppm) | 1200 | 1200 | 700 | 600 | 800 | 600 | 600 | 700 | 500 | 500 | 600 | 500 |

The heat stability data shows a large drop in the bentonite requirement for hot stabilization. In the control wine the bentonite dose for stabilization reached 1200 mg/L. This could be reduced to less than half by some of the pectin plus carrageenan combination as shown in Table 11.

These trials were carried out with fresh grapes or juice under winemaking conditions. A large reduction in bentonite requirement was observed using pectin plus carrageenan treatments. Changes in the volatiles distribution—although not as large as observed under small scale, laboratory conditions, was sufficient to show that these pre-treatments can be used if required to modify the flavour actives in finished wine.

Example 5—Effects of Carrageenan Dose Rate, the Contact Time Between Grape Juice and Pectin Plus Carrageenan During Wine Fermentation This Example was carried out using fresh Sauvignon Blanc grapes grown in Victorian Centre grape growing region. Free run juice was collected and combined with juice after pressing. The details of juice are shown in Table 12 below:

TABLE 12

Sauvignon Blanc juice used in this study.

| Bé | pH | TA | FS0$_2$ | TS0$_2$ | YAN | Malate |
|---|---|---|---|---|---|---|
| 12 | 3.25 | 7.77 | 14 | 41 | 239 | 4 |

Each of 1.5 L juice was added into a 2 L bench top fermenter and mixed vigorously with pectin powder (TS 1580) plus 2% carrageenan solution (CSW-2) using the following recipe for 15 min. An untreated juice was used as the control. The control and the treated juices were mixed with 0 ppm of pectinase and then stored at 4° C. for 16 h before racking. There was no racking in Treatment 5 and 6 (T5 and T6) and therefore the added pectin and carrageenan were carried over to fermentation.

TABLE 13

Juice treatment table. Pectin and carrageenan were mixed with juice as 20° C. using a magnetic stirrer for 15 min.

| Treatment | Control | 1 | 2 | 3 | 4 | 5 | 6 |
|---|---|---|---|---|---|---|---|
| Pectin (g/L) | 0 | 1.5 | 1.5 | 1.5 | 1.5 | 1.5 | 1.5 |
| Carrageenan (g/L) | 0 | 0.15 | 0.20 | 0.30 | 0.50 | 0.15 | 0.15 |

TABLE 13-continued

Juice treatment table. Pectin and carrageenan were mixed with juice as 20° C. using a magnetic stirrer for 15 min.

| Treatment | Control | 1 | 2 | 3 | 4 | 5 | 6 |
|---|---|---|---|---|---|---|---|
| Juice Volume (L) | 1.5 | 1.5 | 1.5 | 1.5 | 1.5 | 1.5 | 1.5 |
| Volume after racking | 1.5 | 1.4 | 1.4 | 1.3 | 1.3 | 1.5 | 1.5 |

10% wine yeast (EC1118) slurry was inoculated into each juice once the fermenters were warmed to 16° C.

Fermentation was controlled between 20-22° C. and the fermentation rate was monitored by measuring Bé (Table 14). Once Bé of each ferment reached zero, it was placed at 4° C. for 7 days. The supernatant (wine) were collected and passed through a 0.45 μm Nylon syringe filter. Heat stability tests were finally carried out using the filtered wine samples using standard test protocols.

TABLE 14

Fermentation data for Sauvignon Blanc. Fermentation temperature was between 20-22° C.

| Sugar (Bé) | Control | 1 | 2 | 3 | 4 | 5 | 6 |
|---|---|---|---|---|---|---|---|
| Day 0 | 12.0 | 12.0 | 12.0 | 12.0 | 12.0 | 12.0 | 12.0 |
| Day 2 | 9.4 | 9.2 | 8.9 | 8.8 | 8.6 | 8.6 | 8.8 |
| Day 5 | 2.1 | 2.8 | 2.2 | 2.2 | 2.6 | 2.6 | 2.8 |
| Day 7 | 0 | 0 | 0 | 0.20 | 0 | 0 | 0 |

The data show that the sugar utilisation was very similar during fermentation in all test cases compared to the control. All fermentations ceased after 7 days and Bé was effectively zero.

TABLE 15

Heat stability data of the treated wine and the control wine. Duplicate samples were taken and measured in most conditions except T4 and T5. Filtration flux is ranked from fast (0) to very slow (5).

| Treatment | Control | 1 | 2 | 3 | 4 | 5 | 6 |
|---|---|---|---|---|---|---|---|
| Filtration difficulty | 5 | 5 | 3 | 0 | 0 | 5 | 5 |
| Turbidity (NTU) | 33.7 | 9.59 | 2.82 | 2.14 | 1.59 | 1.59 | 1.64 |
| | 34.7 | 9.32 | 3.04 | | | 1.49 | 1.48 |

The data (Table 15) shows clearly that wine heat stability is closely related to carrageenan dosage rate. Hence increased carrageenan dosage results in more stable wine judged by the heat test (cf. T1, 2, 3 and 4 in Table 17). This is especially apparent once 0.5 g/L carrageenan was added into the juice. The resulting wine is heat stable, requires no further bentonite treatment. However, the filtration data shows that high carrageenan dose rates reduce filterability to unacceptable values. However, keeping the pectin and carrageenan in the fermentation achieves excellent heat stability as compared to juices that were racked before fermentation (T5 and T6 vs T1). Low carrageenan dose rate can even achieve heat stability and require no further post-fermentation-treatments, provided there is a long-enough contact time, such as in the example above, by leaving carrageenan in the juice during fermentation. At the same time the carrageenan treatment rates are sufficiently low to have little impact on standard filtration practice.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for fining fermentable beverages comprising treating the beverage with a fining composition consisting of:
   (i) a low methyl ester or low methoxy (LM) pectin having a degree of esterification (DE) of 50% or less;
   (ii) a carrageenan; and
   (iii) 0.1 to 2 g/L of bentonite,
   wherein the fining composition is added to the fermentable beverage prior to fermentation.

2. The method according to claim 1, wherein the low methyl ester or low methoxy (LM) pectin has a DE of 0-35%.

3. The method according to claim 2, wherein the LM pectin is a low methyl ester (LMC) pectin or an amidated, low methyl ester (LMA) pectin.

4. The method according to claim 1, wherein the pectin is standardised pectin or an active pectin.

5. The method according to claim 3, wherein the pectin is in the form of an alkali metal salt.

6. The method according to claim 5, wherein the alkali metal salt is a sodium or potassium salt.

7. The method according to claim 1, wherein the amount of pectin added when the beverage is an acidic beverage having a calcium level of 70 mg/l or above is 0.2-5 g/L.

8. The method according to claim 1, wherein the carrageenan is a cold water soluble type or a cold water insoluble type.

9. The method according to claim 8, wherein the cold water soluble type carrageenan is an iota-dominated carrageenan and the cold water insoluble type carrageenan is a kappa-dominated carrageenan.

10. The method according to claim 1, wherein the amount of carrageenan added to the fermentable beverage is 0.02 to 0.2 g/L in liquid form or 0.05 to 0.5 g/L in powder form.

11. The method according to claim 1, wherein the fermentable beverage is a fruit juice or fruit which is subsequently crushed and wherein the pectin and carrageenan are either removed from the juice or fruit during racking or remain in the juice or fruit during fermentation.

12. The method according to claim 1, wherein the fermented beverage is a fermentable alcoholic beverage.

13. The method according to claim 1, wherein the bentonite is present in an amount of 0.1 to 1 g/L.

* * * * *